United States Patent
Verboom

[11] Patent Number: 6,118,746
[45] Date of Patent: Sep. 12, 2000

[54] ADAPTIVE AND SELECTIVE LEVEL CONDITIONING OF A READ CHANNEL IN STORAGE TECHNOLOGIES

[75] Inventor: Johannes Jacobus Verboom, Colorado Springs, Colo.

[73] Assignee: Philips Electronics North America Corporation, New York, N.Y.

[21] Appl. No.: 09/107,808

[22] Filed: Jun. 30, 1998

[51] Int. Cl.[7] .................................................. G11B 5/09
[52] U.S. Cl. .............................................. 369/59; 369/48
[58] Field of Search .................................. 369/47, 48, 54, 369/59, 124.05, 124.15; 360/46, 51, 65

[56] References Cited

U.S. PATENT DOCUMENTS

| | | | |
|---|---|---|---|
| 4,646,281 | 2/1987 | Verboom | 369/59 |
| 4,907,212 | 3/1990 | Pharris et al. | 369/54 |
| 5,126,991 | 6/1992 | Verboom | 369/59 |
| 5,295,127 | 3/1994 | Verboom et al. | 369/59 |

*Primary Examiner*—Thang V. Tran
*Attorney, Agent, or Firm*—Michael Schmitt

[57] ABSTRACT

A method, circuit and system for selectively and adaptively effecting level conditioning of selected samples of a read signal in storage technologies. A circuit embodying the present invention includes sample logic, arithmetic logic and conditioning logic. The sample logic receives samples and provides a main sample and one or more selected neighbor samples. The arithmetic logic compares the main sample to the neighbor samples toward determining satisfaction of selected conditioning criteria. If the selected conditioning criteria are satisfied, the conditioning logic selectively and adaptively effects level conditioning as to the main sample. A method embodying the present invention comprises obtaining level conditioning parameters in association with a reference field of the read signal; sampling the read signal at channel bit locations to provide a plurality of samples; selecting a main sample from the plurality of samples; selecting one or more neighbor samples from the plurality of samples, the neighbor samples being disposed at predetermined distances, in channel bits, from the main sample; comparing the main sample to each of the neighbor samples to determine satisfaction of selected conditioning criteria; applying, where the selected conditioning criteria are determined to be satisfied, level conditioning to the main sample, such level conditioning being responsive to the level conditioning parameters.

20 Claims, 3 Drawing Sheets

ADAPTIVE AND SELECTIVE LEVEL CONDITIONING OF A READ CHANNEL IN STORAGE TECHNOLOGIES

RELATED APPLICATION

U.S. patent application of Johannes J. Verboom and Fred N. Wamble, Ser. No. 08/994,874, filed Dec. 19, 1997, and entitled METHOD AND APPARATUS FOR MAXIMUM LIKELIHOOD DETECTION, is hereby incorporated by reference. U.S. patent application of Johannes J. Verboom, Ser. No. 09/105,856 (PHA 23-326), filed Jun. 26, 1998, and entitled ADAPTIVE AND SELECTIVE CANCELLATION OF INTER-SYMBOL INTERFERENCE OF A READ CHANNEL IN STORAGE TECHNOLOGIES, is hereby incorporated by reference.

BACKGROUND OF THE INVENTION

The invention relates generally to data recovery of storage technologies, and more particularly to methods, apparatuses and systems for data recovery by adaptive and selective level conditioning of a read channel of storage technologies.

Advances in manufacturing technologies and system architecture have led to increasingly powerful consumer electronic devices and computers. These consumer electronic devices and computers support features and applications, such as multimedia, in connection with which vast amounts of information are processed and stored. Generally, the amount of information is not only vast, but also ever-increasing.

To provide the information, storage technologies have been developed, including magnetic, optical and magneto-optical technologies. Although these technologies provide relatively large storage capabilities, the technologies generally demand ongoing improvement so as to overcome factors limiting storage capacity. Among other areas for ongoing improvement is the accurate detection of recorded data, particularly while increasing the recording density.

Detection of recorded data is conventionally accomplished using a threshold. As an example, channel bits of an optical read channel (using, for example, 1,7 run-length-limited modulation coding) are detected by comparing a read signal to a predetermined threshold: if the read signal exceeds the threshold at a particular channel-bit location, that channel-bit is considered a '1' (i.e., a mark); otherwise the channel-bit is considered a '0' (i.e., a space).

Detection against a threshold typically relies on setting an appropriate threshold. Generally, the threshold is set toward recovering recorded information within an acceptable bit error rate. To do so, the threshold optimally is set to the center of an "eye-pattern", the eye-pattern being a measure that indicates the amplitude and phase margins of the read signal. However, the read signal's amplitude and phase margins tend to be affected by various parameters, including, among others, the write power, the write sensitivity of the media, the quality of the spot of the write and read drives (e.g., mark size variations), the focus offset of the write and read drives, and the recording density. For example, increased recording density tends to increase inter-symbol interference ("ISI") such that amplitude margins can degrade as to both marks and spaces. Moreover, because these parameters vary across systems and media, the center of the eye pattern tends to vary and, in turn, the optimal threshold setting tends to vary.

Accordingly, it is desirable to provide for accurate detection of recorded data while accommodating increased recording density and other parameters that tend to cause the threshold to vary and margins to degrade.

SUMMARY OF THE INVENTION

Methods, circuits and systems are provided for enhancing the accuracy of detection of recorded data while accommodating increased recording density and other parameters that tend to cause the threshold to vary and margins to degrade. More specifically, methods, circuits and systems are provided that adaptively and selectively condition the levels of samples of a read signal. An advantage of the method, circuit and system is that reliable margins are established for selected samples, thereby improving detection of recorded data, particularly at enhanced recording density.

A circuit embodying the present invention includes sample logic, arithmetic logic and conditioning logic. The sample logic receives samples and provides a main sample and one or more selected neighbor samples. The arithmetic logic compares the main sample to the neighbor samples toward determining satisfaction of selected conditioning criteria. If the selected conditioning criteria are satisfied, the conditioning logic selectively and adaptively effects level conditioning as to the main sample. Preferably, the conditioning is bi-level substitution, wherein either an upper substitution level or a lower substitution level is substituted for a selected main sample.

A method embodying the present invention comprises obtaining level conditioning parameters in association with certain reference marks of the read signal; sampling the read signal at channel bit locations to provide a plurality of samples; selecting a main sample from the plurality of samples; selecting one or more neighbor samples from the plurality of samples, the neighbor samples being disposed at predetermined distances, in channel bits, from the main sample; comparing the main sample to each of the neighbor samples to determine satisfaction of selected conditioning criteria; and applying, where the selected conditioning criteria are determined to be satisfied, level conditioning to the main sample responsive to the level conditioning parameters.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which its preferred embodiments are illustrated and described, wherein like reference numerals identify the same or similar elements.

DETAILED DESCRIPTION

Terminology

Figure 1A:
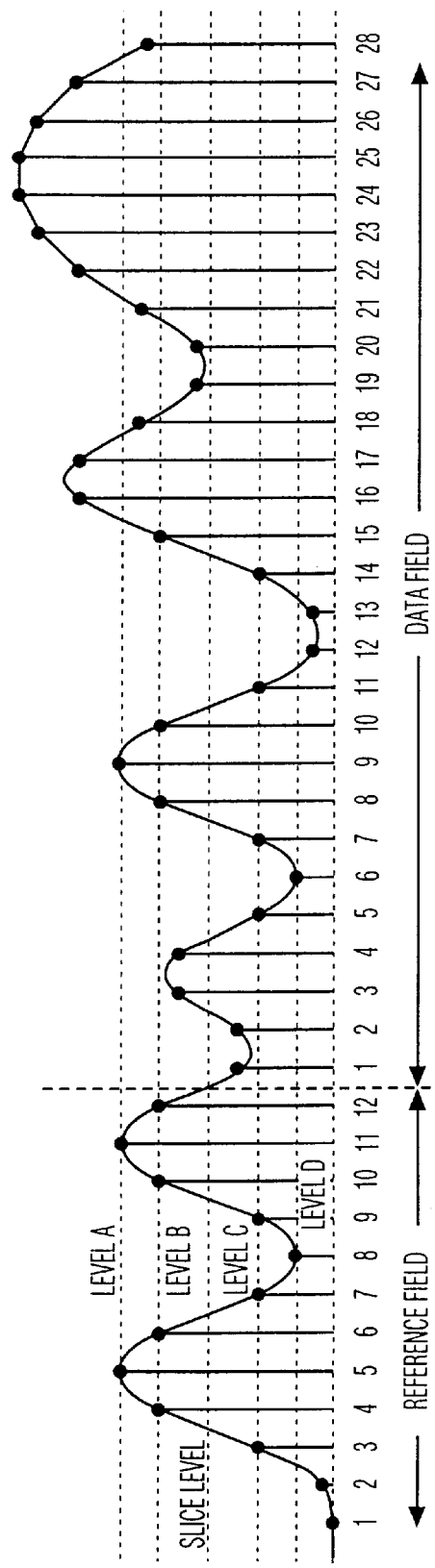
FIG. 1(a) shows a read signal, the read signal having reference and data fields.

Read channel, as used herein, refers to optical, electrical, magnetic and mechanical elements that deliver signals from the surface of recording media to processing elements for conversion to formats convenient for a user.

K-constraint, as used herein, refers to the maximum number of consecutive logical zeroes (or ones) in any sequence of binary channel bits, in which the logical ones (zeroes) represent the location of signal transitions.

D-constraint, as used herein, refers to the minimum number of consecutive logical zeroes (or ones) in any sequence of binary channel bits, in which the logical ones (zeroes) represent the location of signal transitions. The d-constraint is employed to determine the distance between samples for evaluation in selecting channel bits subject to level substitution, as described more fully below.

Level conditioning, as used herein, refers to manipulating selected samples so as to enhance performance (e.g., reliability) in detection or otherwise. Advantages of level conditioning include, as an example, improved detection of logical polarity (i.e., '1' or '0') for channel bits of a read signal, particularly in the case of enhanced recording density or other circumstances that can lead to read errors (e.g., due to threshold variation or margin degradation).

Overview

Embodiments of the present invention apply level conditioning to selected samples of a read signal. Level conditioning is implementable variously. Level conditioning preferably is responsive to level conditioning parameters. The level conditioning parameters preferably are obtained in association with predetermined patterns of marks and spaces in a reference field of the read signal. In one embodiment, level conditioning is implemented by assigning one of one or more substitution levels to a sample, the substitution levels preferably being derived from the level conditioning parameters. In this embodiment, it is preferred that the derivation entails setting each substitution levels equal to a respective level conditioning parameter. In such case, the level conditioning parameters preferably are based on various levels detected from the patterns of the reference field. It is to be understood in such case, however, that the level conditioning parameters may be otherwise based and the substitution levels need not be set equal to a respective level conditioning parameter.

However implemented, level conditioning preferably is adaptable. With assignment of substitution levels, adaptable level conditioning comprises adaptively obtaining level conditioning parameters and/or adaptively deriving substitution levels. In such case, adaptively deriving one or more substitution levels entails updating, adjusting and/or repeatedly deriving the levels (e.g., at set intervals and/or responsive to one or more triggering events).

Reference Marks

In an illustrative embodiment of the present invention, a disk is formatted to comprise a plurality of tracks, each track including a selected number of segments (e.g., 225), and each segment having a selected number of frames (e.g., 16). Each frame comprises one or more fields. The fields contain pre-formatted marks that are employed to provide selected functions, including, among others, clock synchronization, track following, track capturing, addressing and track counting.

Each frame also comprises a recordable field. The recordable field is provided for recording user data. The data is organized in logical sectors, each sector preferably beginning at a frame boundary. Each sector comprises a selected number (e.g., 1024 or 2048) of data bytes, together with other information. Such other information provides one or more functions including, among others, error correction.

FIGS. 1(a) and (b) show typical read signals of a read channel, according to the present invention. Each read signal includes (i) reference marks and spaces in a reference field, (ii) illustrative data marks and spaces in a data field, the data field comprising user data and (iii) various levels, including threshold (a.k.a., "slice") levels. Although the illustrated read signals are analog, each preferably is processed as discrete values sampled at a selected frequency.

According to the principles of the invention, selected samples associated with the reference field are employed in level conditioning. In one embodiment, the selected samples are detected to obtain level conditioning parameters. In a more specific embodiment, the selected samples are detected using a selected pattern of marks and spaces in the reference field. In an embodiment wherein level conditioning comprises assignment of substitution levels, the pattern preferably is employed to obtain level conditioning parameters from which are derived upper and/or lower substitution levels: an upper substitution level having an amplitude that is greater than the prevailing detection threshold and a lower substitution level having an amplitude that is lesser than the prevailing detection threshold.

The reference field preferably has patterns of marks and spaces selected to optimize level conditioning. For example, it is preferred that the reference field has a pattern representative of worst case detection characteristics likely to occur in association with a data field, such that the level conditioning optimally enhances detection accuracy. As an example, the patterns preferably have a space-distances between marks that, while complying with coding (e.g., 1,7RLL, 2,7RLL, NRZ, 8/9, EFM+, etc.), maximally stress the system.

The reference patterns can be variously provided. The reference patterns preferably comprise either or both (i) a selected set (e.g., number and arrangement) of predetermined marks and spaces located in one or more of the frames and (ii) preamble bytes associated with each sector. In one embodiment, the selected set comprises two marks located in a frame's recordable field and covering twelve channel bits, as shown in FIGS. 1(a) and (b). In this embodiment, the predetermined marks preferably are repeated in each frame such that they are interleaved in the user data, e.g., the user data of one logical sector typically being stored in plural frames with each frame including the predetermined marks.

In another embodiment, the preamble bytes preferably are twelve in number (e.g., where the user data bytes are 2048 in number) and comprise two marks per byte (i.e., 24 total marks), all of which marks are located in the recordable field of the first frame associated with the sector.

In another embodiment, the preamble bytes correspond to the selected set. For example, the two predetermined marks of the selected set are employed 1 to 12 times in the sector's first frame in providing the preamble. In so doing, functions associated with the marks can be implemented based on one or more algorithms and using isolated and/or redundant reference mark information.

If the preamble consists of 12 occurrences of the selected set, the samples preferably are averaged (or otherwise manipulated) over the 12 bytes in obtaining the level conditioning parameters at the beginning of each sector. Thereafter, the level conditioning parameters preferably are obtained, adjusted or updated using all or a portion of the selected set in one or more frames subsequent to the first frame of the sector, e.g., either non-preamble marks or subsequent preamble marks (hereinafter, the term "adaptive acquisition" is sometimes used to refer to, any or all of, obtaining, adjusting and/or updating respective level conditioning parameters).

As an example, the level conditioning parameters are updated or adjusted based on any or all of the selected set located in one or more frames subsequent to the first frame of the sector (e.g., redundant reference mark information). The update/adjustment can be based on such selected set either individually from a frame, or in groups, or collectively across frames. In this example, level conditioning is responsive to the level conditioning parameters associated with the subsequent frames' selected set, the level conditioning thereby being updated on an ongoing basis. It is understood, however, that level conditioning can also be updated from one or more of the subsequent frames' selected set (all or part thereof) in the absence of adjustments to the level conditioning parameters, without departing from the principles of the invention.

As another example, the level conditioning parameters are obtained based solely on the portion of the selected set that is located in one or more frames subsequent to the first frame of the sector (e.g., isolated reference mark information). In this example, level conditioning preferably is repeatedly obtained on an ongoing basis, the level conditioning associated with a frame being derived from the level conditioning parameters associated with the selected set in that frame in the sequence of frames, and without reference to level conditioning parameters of other sets of other frames.

Although the reference patterns can be provided as specifically described above, it is understood that such patters can be otherwise provided without departing from the principles of the invention. For example, while the above-description locates the reference patterns in the recordable fields of the frames, it is understood that some or all of a reference pattern can be preformatted. However, it is preferred that the reference patterns be recorded with the user data in the recordable field so that the reference patterns are subject to parameters prevailing as the user data is written/read.

Level Conditioning Parameters

It is to be understood that the level conditioning parameters are obtainable from information of the reference field using various arrangements. Referring to FIGS. 1(a) and (b), examples of arrangements include:

1) Detect the value of any one of samples 4, 6, 10 or 12; or
2) Detect and average the values of all or some combination of samples 4, 6, 10 and 12; or
3) Detect the value of any one of samples 3, 7 or 9; or
4) Detect and average the values of all or some combination of samples 3, 7 and 9; or
5) Detect the values of samples 5 and/or 11, averaging if both samples are detected; or
6) Detect the value of sample 8; or
7) Combine one or 1) or 2) above with one of 4) or 5) above, with or without combining 5) and/or 6).

Notwithstanding the above example arrangements, it is understood that other arrangements can be implemented in obtaining level conditioning parameters (e.g., interpolation, multiple alternative computations, and the like), without departing from the principles of the invention.

In the first example, it is preferred that the level conditioning parameters be obtained by (i) digitizing the read signal via an appropriately fast analog-to-digital converter, and (ii) acquiring the applicable sample for storage in a register. In the second example, it is preferred that the level conditioning parameters be obtained by (i) digitizing the read signal via an appropriately fast analog-to-digital converter, (ii) acquiring samples for accumulation, e.g., in a register, and (iii) manipulating the contents of the register to obtain the average result.

It is to be understood level conditioning preferably is responsive to the level conditioning parameters. In one embodiment, level conditioning comprises assigning a selected substitution level to a selected sample, the substitution level being derived from the level conditioning parameters. In another embodiment, level conditioning can comprise manipulating a sample other than by such assignment, including, as an example, by applying an offset, in which case the offset preferably is derived from the level conditioning parameters. As yet another example, level conditioning can employ a calculation based on the level conditioning parameters. It is understood that level conditioning may be responsive to the level conditioning parameters, but engender processes other than as described herein, without departing from the principles of the invention.

FIGS. 1(a) and (b) also illustrate that level conditioning preferably is applied only for samples of the data field.

Level Conditioning Method

Figure 1B:
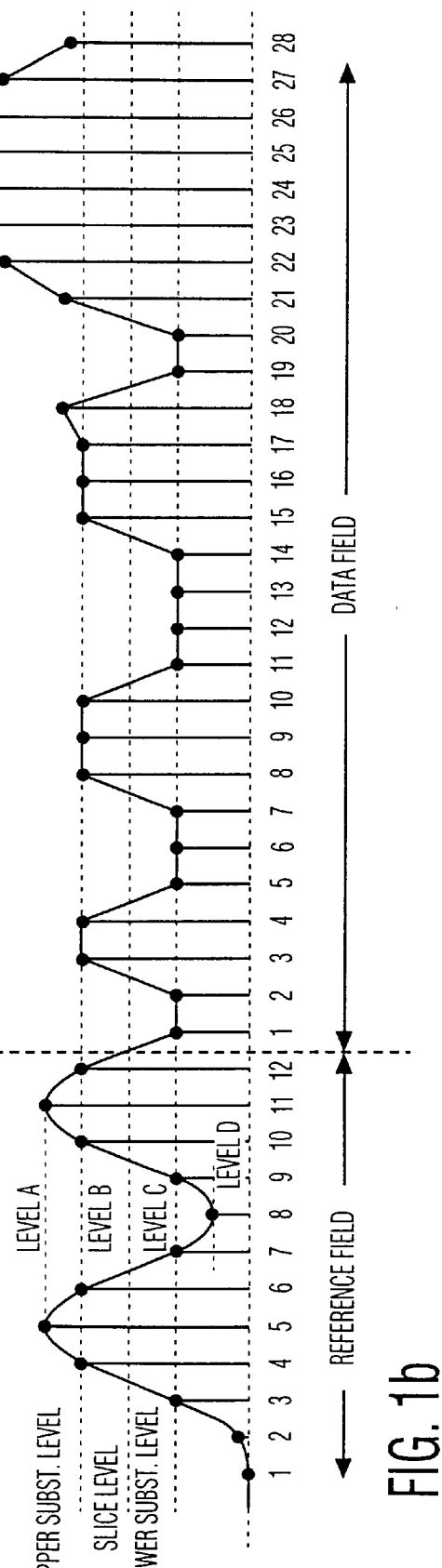
FIG. 1(b) shows a processed read signal, the processed read signal having reference and data fields, including data marks and spaces subject to level conditioning.

FIGS. 1(a) and (b) illustrate a read signal. The read signal has two initial reference marks, these marks being followed, in a data field, by marks and spaces in a 1,7RLL coding sequence. Moreover, as illustrated, samples 1, 2, 3, 4, 19 and 20 of FIG. 1(a) have levels near to the detection threshold TH. As to these samples, then, the tendency for a read error typically increases, e.g., responsive to noise and/or threshold transients. As such it is desirable to apply level conditioning to these samples in order to improve their respective amplitude margins. To illustrate level conditioning, FIG. 1(b) shows that samples 1, 2, 19 and 20 have had their levels lowered to Level C, while samples 3 and 4 have had their levels raised to Level B. In the case of samples 19 and 20, it is noteworthy that the levels thereof originally were above the slice level and that, after level conditioning, the levels are properly below the slice level with sufficient margin to expect no read error. (The original levels of samples 19 and 20 reflect the real-world circumstance of two relatively large marks sandwiching a space.) To further illustrate level conditioning, FIG. 1(b) shows that samples 6, 12 and 13 have had their levels raised to Level C, while samples 9, 16 and 17 have had their levels lowered to Level B, whereby Levels B and C provide respective upper and lower limits for selected samples.

Accordingly, the level conditioning method is directed to identify samples such as samples 1, 2, 3, 4, 6, 9, 12, 13, 16, 17, 19 and 20 and, where appropriate, to apply level conditioning thereto. Generally, the level conditioning method is directed to so identify samples selectively: preferably those samples that are likely to cause read errors are preferentially selected. In addition, the level conditioning method is directed to be adaptive, where adaptability preferably is achieved from information of the reference field (e.g., including from information relating to one or both of preamble marks and interleaved marks).

In the method based on FIGS. 1(a) and (b), the read signal is sampled at channel bit locations to obtain main and neighbor samples. The main samples are tested against selected conditioning criteria to determine whether level conditioning is to be applied. For this illustration, the selected conditioning criteria are satisfied either (a) if a main sample has a level that is less than the levels of both of the two neighbor samples disposed at predetermined distances (here, two channel bits) from the main sample or (b) if a main sample has a level that is greater than the levels of both of the two neighbor samples disposed at predetermined distances (here, two channel bits) from the main sample. Stated more generally, in the case of one main and two neighbor samples, selected conditioning criteria typically comprise determining that a common arithmetic sign is associated with the differences between the levels of the main sample and each of the respective neighbor samples.

Level conditioning preferably is effected by assigning an upper or lower substitution level to the main sample. For example, if the main sample is greater than both of the neighbor samples, then an upper substitution level is assigned to the main sample. However, if the main sample is less than both of the neighbor samples, then an lower substitution level is assigned to the main sample. While, in this embodiment, the upper and lower substitution levels are described as a single pair, it is to be recognized that other arrangements can be employed without deviating from the principles of the invention. Examples of other arrangements include: (i) pairs need not be employed, (ii) the pairings may be unbalanced (e.g., three upper substitution levels paired with a two lower substitution levels), and (iii) more than one pair of substitution levels may be employed. Particularly in the latter two examples, the assignment of a particular substitution level from among plural (upper or lower) substitution levels preferably is determined according to selected assignment criteria.

So as to preclude inappropriate selection of a sample for level conditioning, the main sample preferably is selected for level conditioning only if a preclusion function is satisfied. The preclusion function preferably uses selected, one or more conditioning trigger values; as such, level conditioning is effected provided that the appropriate conditioning trigger value is exceeded by the difference between the levels of (i) the main sample and (ii) selected of the neighbor samples. In the illustrated example, level conditioning is effected using level substitution. In that embodiment, level substitution of a lower substitution level is effected when a first conditioning trigger value is exceeded by the difference between the levels of (i) the main sample and (ii) both of the neighbor samples, whereas level substitution of an upper substitution level is effected when such difference is exceeded by a second conditioning trigger value. In any case, the conditioning trigger values preferably are determined using selected parameters, including ripple and/or noise. Moreover, as described further below, the conditioning trigger values preferably are derived from information of the reference field.

As is also described further below, the distance between the main sample and the neighbor samples preferably is selected to optimize level conditioning. The selection typically responds to factors, such as coding. In the case of 1,7RLL coding, for example, the distance preferably is two channel bits on either side of the main sample.

Level Conditioning Circuit

Figure 2:
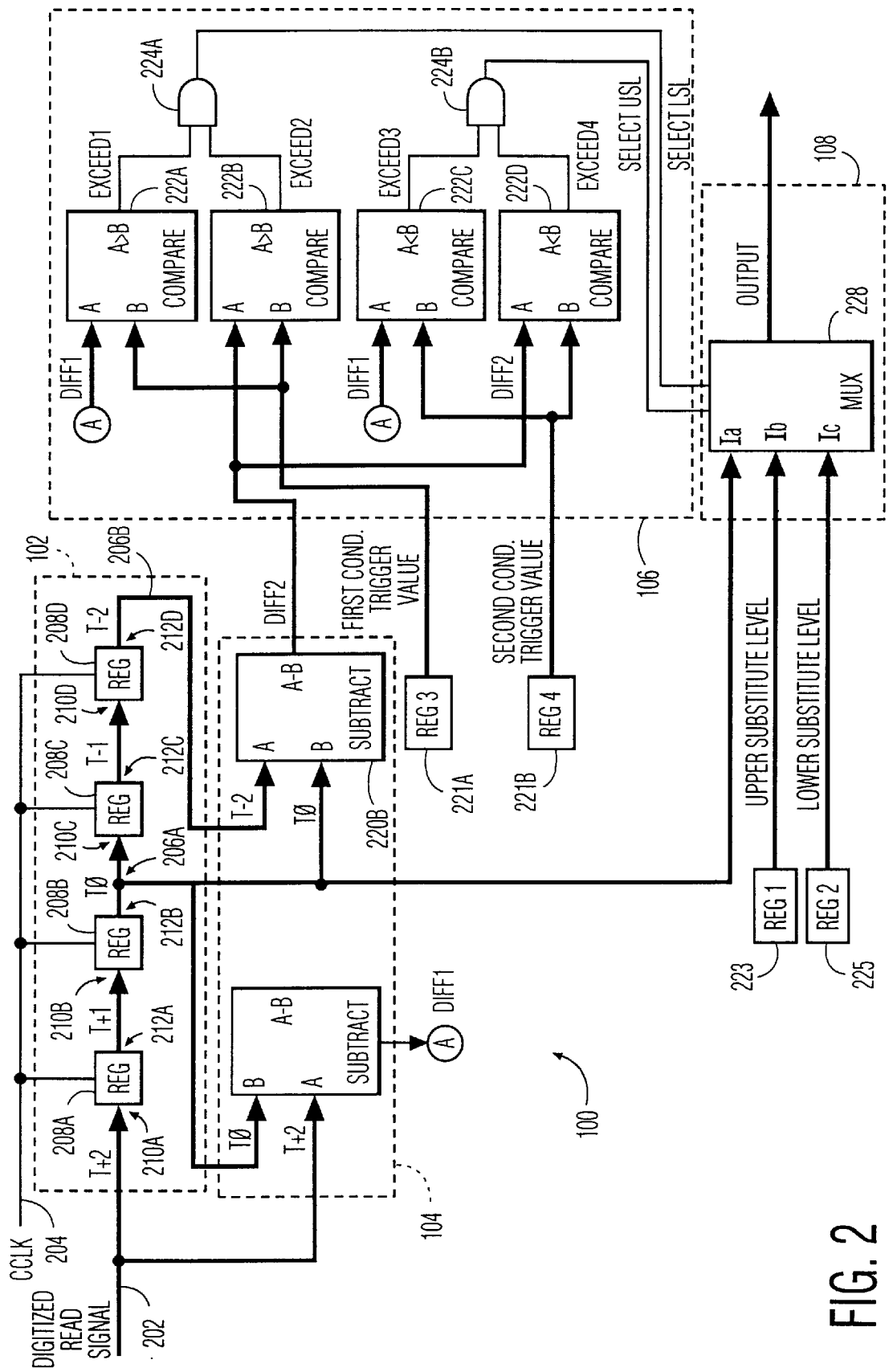
FIG. 2 is a block diagram of a level conditioning circuit associated with a read channel, in accordance with the present invention.

Referring to FIG. 2, a level conditioning circuit 100 is shown, in accordance with the present invention. Level conditioning circuit 100 comprises sample logic 102, arithmetic logic 104, sample selection logic 106 and conditioning logic 108. In the illustrative embodiment shown in FIG. 2, circuit 100 is implemented responsive to 1,7RLL coding.

The sample logic 102 receives a digitized read signal 202 and generates a main and two neighbor signals, the main samples being selectively chosen for level conditioning. Sample logic 102 has selected taps 206A and 206B, and is clocked by a channel clock 204 (CCLK).

Sample logic 102 also has memory elements 208A, 208B, 208C and 208D. Each of the memory elements 208A–D receives the CCLK 204 and is one bit deep so as to introduce a one clock cycle delay. The memory elements 208A–D have respective input terminals 210A–D and output terminals 212A–D. The output terminal 212A is coupled to the input terminal 210B; the output terminal 212B is coupled to the input terminal 210C; and the output terminal 212C is coupled to the input terminal 210D. The output terminals 212B and 212D are coupled to taps 206A and 206B, respectively.

The input terminal 210A receives the digitized read signal 202. Accordingly, as clocked by CCLK 204, the digitized read signal is provided (i) at tap 206A after two clock cycles of delay following receipt at input terminal 21 OA and (ii) at tap 206B after four clock cycles of delay following such receipt, i.e., two clock cycles of delay following provision at tap 206A. For the discussions that follow, (a) T0 denotes the main signal, i.e., samples of the delayed digitized read signal as provided at tap 206A, (b) T−2 denotes a first neighbor signal, i.e., samples of the delayed digitized read signal as provided at tap 206B and (c) T+2 denotes a second neighbor signal, i.e., samples of the digitized read signal 202 as received by the level conditioning circuit 100.

Taps 206A and 206B and input terminal 210A are coupled to arithmetic logic 104. Arithmetic logic 104, as illustrated, comprises subtractors 220A and 220B. In this example, tap 206A is coupled to each of subtractors 220A and 220B, while subtractor 220A is also coupled to the input terminal 210A, and while subtractor 220B is also coupled to tap 206B. Subtractor 220A subtracts each sample of T0 from a corresponding sample of T+2 to provide an output signal Diff1. Subtractor 220B subtracts each sample of T0 from a corresponding sample of T−2 to provide an output signal Diff2.

The output signals Diff1 and Diff2, as shown, are provided to sample selection logic 106. Sample selection logic 106, as illustrated, comprises (a) comparators 222A, 222B, 222C and 222D and (b) control logic 224A and 224B. Comparators 222A and 222B compare respective output signals Diff1 and Diff2 to a selected first conditioning trigger value and, based thereon, provide respective signals Exceed1 and Exceed2. Comparators 222C and 222D compare respective output signals Diff1 and Diff2 to a selected second conditioning trigger value and, based thereon, provide respective signals Exceed3 and Exceed4. The Exceed1 and Exceed2 signals are provided as inputs to control logic 224A, while the Exceed3 and Exceed4 signals are provided as inputs to control logic 224B. Control logic 224A and 224B, in this illustration, are implemented as respective AND gates. Control logic 224A and 224B provide, respectively, a Select LSL signal and a Select USL signal.

Although the first and second conditioning trigger values are shown provided to the comparators 222A–D from memory elements 221A and 221B, it is to be recognized that the conditioning trigger values can be otherwise provided, without departing from the principles of the invention. Moreover, it also to be recognized that a single trigger value can be used, provided by any of the structure previously described, without departing from the principles of the invention.

The comparison to one or more conditioning trigger values preferably is implemented so as to preclude selection of samples for level conditioning (referred to sometimes herein as the "preclusion function"). In implementing the preclusion function, it is preferred that conditioning trigger values be derived from information of the reference field. As one example, in the case of level substitution, the conditioning trigger values preferably are set to a fraction (e.g., one-half) of a respectively associated substitution level. As another example, the conditioning trigger values are based on characterization of ripple, such as by including appropriate mark(s) and/or spaces in the reference field. As yet another example, the conditioning trigger values are based on characterization of channel noise. As still another example, the conditioning trigger values are based on a combination of one or more of the above, with or without additional parameters. In any case, it is understood that other trigger setting approaches can be used without departing from the principles of the invention.

The preclusion function can be selectively disabled or not implemented. In such cases, the conditioning trigger values preferably are set to a reference amplitude, e.g., zero.

The conditioning logic 108 is coupled to the sample logic 102 and to the sample selection logic 106. From the sample logic 102, the conditioning logic 108 receives samples of T0. From the sample selection logic 106, the applying circuit 228 receives the Select USL and Select LSL signals.

In a level-substitution-based embodiment, the conditioning logic 108 preferably comprises applying circuit 228 coupled to memory elements 223 and 225. From memory elements 223 and 225, the applying circuit 228 receives, as respective inputs, a signal comprising an upper substitution level and a signal comprising a lower substitution level. Although these substitution levels are shown provided to the applying circuit 228 from respective memory elements 223 and 225, it is to be recognized that these substitution levels can be otherwise provided, without departing from the principles of the invention.

In operation of the level-substitution-based embodiment, the applying circuit 228 provides an output signal under control of the Select USL and Select LSL signals. To illustrate, control is as shown in Table 1 (a truth table, wherein S-USL represents the Select USL signal, S-LSL represents the Select LSL signal, and Output represents the output signal of applying circuit 228):

TABLE 1

| S-USL | S-LSL | Output |
|---|---|---|
| 0 | 0 | T0 sample |
| 0 | 1 | Lower Substitute Level |
| 1 | 0 | Upper Substitute Level |
| 1 | 1 | Invalid/Special |

As shown in this table, if both Select signals are low, the T0 sample is output. However, if one of the Select signals is high, the substitution level associated with the high signal is output. Moreover, if both of the Select signals are high, an invalid/special state is present. In this state, the T0 sample can be output or, alternatively, special processing can be provided. For typical conditioning trigger values, this invalid/special state would not arise. As such, special processing would generally be triggered by additional logic controlling either/both the conditioning trigger values, the conditioning circuit 108 and/or the sample selection logic 106.

Special processing can include processing other than the level conditioning described herein. As an example, such special processing could entail processing of the read signal for reasons differing from, or even antithetical to, the promotion of read accuracy.

As illustrated, the applying circuit 228 preferably is implemented as a three input multiplexer under control of the Select USL and LSL signals received from the sample selection logic 106.

The level conditioning circuit 100 of the illustration, as previously described, is responsive to 1,7 run-length-limited (RLL) modulation code. For example, the circuit 100 comprises sample logic 102 having four memory elements 208A–D, these elements having taps 206A and 206B and introducing clock cycle delays such that, as clocked by CCLK 204, the digitized read signal is provided (i) at tap 206A after two clock cycles of delay following receipt at input terminal 21 OA and (ii) at tap 206B after two clock cycles of delay following provision at tap 206A. So configured, the sample logic 102 is enabled to provide (a) the main signal T0 of samples at tap 206A, (b) a first neighbor signal T−2 of samples at tap 206B and (c) a second neighbor signal T+2 of samples as such signal is originally received by the level conditioning circuit 100. Generally, this implementation responds to the d-constraint of the RLL coding: because the d-constraint defines the minimum distance between channel-bit transitions, the d-constraint determines the distance of the two neighbor signals of samples to be evaluated in determining whether samples in the main signal are subjected to level conditioning.

For codes other than 1,7RLL, the d-constraint typically changes. Responsive thereto, the level conditioning circuit 100 typically is implemented differently than as illustrated. As an example, the sample logic 102 typically is implemented with a different number of memory elements 208 and/or differently-distanced taps 206, so as to provide main and neighbor signals having an appropriate delay relationship. Table 2 shows, for various example codes, the d-constraint and distance of neighbors (in channel-bits).

TABLE 2

| Code | D-constraint | Distance of Neighbors |
|---|---|---|
| NRZ | d = 0 | 1 |
| 8/9 | d = 0 | 1 |
| 1, 7RLL | d = 1 | 2 |
| 2, 7RLL | d = 2 | 3 |
| EFM+ | d = 2 | 3 |

Figure 3:
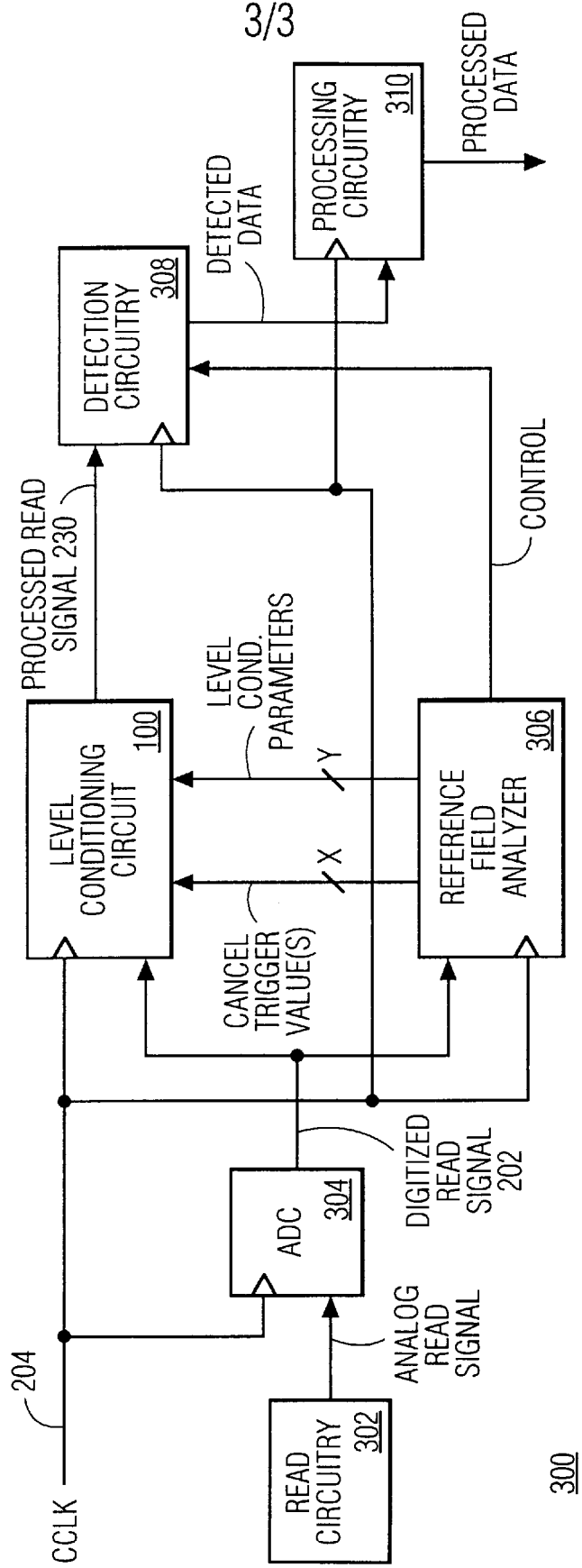
FIG. 3 is a block diagram of a storage system, the system including a level conditioning circuit associated with a read channel, in accordance with the present invention.

FIG. 3 is a block diagram of a storage system 300, in accordance with the present invention. The storage system 300 comprises: (i) read circuitry 302 that provides for reading the storage media so as to generate an analog read signal; (ii) an analog to digital converter (ADC) circuit 304 that receives the analog read signal and generates therefrom the digitized read signal 202; (iii) reference field analyzer 306 which receives the digitized read signal and, based on the marks and/or spaces of one or more reference fields, obtains one or more level conditioning parameters and, if so implemented, one or more conditioning trigger values and detection control signals; (iv) the level conditioning circuit 100 which receives the digitized read signal, the conditioning trigger values and the level conditioning parameters so as to generate the processed read signal 230, such signal 230 comprising a read signal for which level conditioning is selectively (and, preferably, adaptively) effected as to selected samples; (v) detection circuitry 308 which (a) receives both the processed read signal 230 from the level conditioning circuit 100 and the detection control signals from the reference field analyzer 306 and (b) generates an output signal comprising detected data (e.g., a sequence of transitions); and (vi) processing circuitry 310 for processing the data of the detection circuitry's output signal. The system 300 also preferably comprises the channel clock (CCLK) 204, which is applied to and clocks each of the above components. In this system 300, levels A and D of FIGS. 1(*a*) and (*b*) preferably are selectively employable to set upper and lower limits of ADC circuit 304, including so as to enhance resolution.

The detection circuitry 308 can be variously implemented within the principles of the invention. As an example, the circuitry 308 can be implemented to provide conventional bit-slice technology (i.e., detection based on a threshold). As another example, the circuitry 308 can be implemented to provide an adaptive bit-slice technology. As yet another example, the circuitry 308 can be implemented to provide maximum likelihood detection mechanism, as such mechanism is described in the U.S. patent application of Johannes J. Verboom and Fred N. Wamble, Ser. No. 08/994,874, filed Dec. 19, 1997, and entitled METHOD AND APPARATUS FOR MAXIMUM LIKELIHOOD DETECTION, which is hereinabove incorporated by reference. In this latter example, levels A and D of FIGS. 1(*a*) and (*b*) preferably are selectively employable to set the clip level in maximum likelihood detection, in accordance with the above reference.

In each case, it is preferred that the detection circuitry 308 be coupled to the reference field analyzer 306 so as to receive detection control signals which are relevant to operation of the detection circuitry 308. As to a maximum likelihood detection mechanism, the detection control signals indicate, e.g., the clip level applicable to the digitized read signal.

As to both conventional and adaptive bit-slice technology, the detection control signals preferably indicate the detection threshold applicable to each sample. For conventional bit slice technology, the detection threshold typically is fixed, being derived from selected samples of the reference field (e.g., the detection threshold is based on the average of samples 3, 4, 9 and 10). For adaptive bit slice technology, the detection threshold tends to vary. As an example, the detection threshold can be derived from samples of the reference field, the threshold being updated, adjusted or re-derived at predetermined intervals, or based on predetermined stimuli, or based on combinations of both.

The system 300 can be otherwise implemented without departing from the principles of the invention. As an example, the detection circuitry can generate its own detection control signals, rather than receiving these signals from the reference field analyzer 306. In such case, the Processed Read Signal 230 preferably comprises reference field information.

As another example, so as to provide each or any of the conditioning trigger values and the level conditioning parameters, the system 300 preferably comprises respective registers for updating/adjusting each such value/parameter. In this regard, it is contemplated that each of the conditioning trigger values and the level conditioning parameters can be one or more in number (as illustrated in FIG. 3 by use of the "x" and "y" reference letters). It is also contemplated that the reference field analyzer 306 provide, in place of the level conditioning parameters, one or more substitution levels (e.g., upper and/or lower substitution levels, in pairs or other arrangements, as described above), these levels preferably being derived from level conditioning parameters obtained from the reference field of the digitized read signal 202.

Conclusion

The present invention provides systems, methods and apparatus for recovering data from recording media, including, for example, magnetic disk, optical disk, optical tape, and magneto-optical systems. An example advantage of embodiments of the present invention is that it enables provision of accurate detection of recorded data while accommodating increased recording density and other parameters that tend to cause the threshold to vary and margins to degrade.

It will be understood that various other changes in the details, materials, and arrangements of the parts and steps which have been described and illustrated in order to explain the nature of this invention may be made by those skilled in the art without departing from the principles and scope of the invention as expressed in the subjoined claims.

What is claimed is:

1. A method of conditioning samples of a read signal in storage technologies, the read signal comprising samples associated with a reference field, the method comprising:

obtaining one or more level conditioning parameters in association with selected samples associated with the reference field;

selecting a main sample from the read signal;

selecting one or more neighbor samples from the read signal, the neighbor samples being disposed at predetermined distances, in channel bits, from the main sample;

comparing the main sample to each of the neighbor samples to determine satisfaction of selected conditioning criteria; and level conditioning, where the selected conditioning criteria are determined to be satisfied, the main sample, the level conditioning being responsive to one or more of the obtained level conditioning parameters.

2. A method as claimed in claim 1, wherein level conditioning comprises assigning selected one of one or more substitution levels for the main sample.

3. A method as claimed in claim 1, wherein selecting of neighbor samples is responsive to the coding of the read signal.

4. A method as claimed in claim 1, wherein comparing the main sample to each of the neighbor samples comprises differencing the levels of the main sample and each of a selected plurality of neighbor samples.

5. A method as claimed in claim 4, wherein comparing the main sample to each of the neighbor samples comprises subtracting the level of the main sample from the levels of two or more neighbor samples, such neighbor samples being at selected channel bit spacing from the main sample, and wherein determining satisfaction of selected conditioning criteria comprises determining that each said level subtraction yields a number having a common arithmetic sign.

6. A method as claimed in claim 1, further comprising effecting a preclusion function so as to selectively preclude effecting level conditioning as to a main sample, wherein effecting a preclusion function comprises finding a set of differences between the main sample and selected of the neighbor samples, and comparing said set of differences to selected one or more conditioning trigger values.

7. A method as claimed in claim 6, wherein effecting a preclusion function comprises using a conditioning trigger value that is derived from selected samples associated with the reference field.

8. A method as claimed in claim 1, wherein obtaining the level conditioning parameters comprises selecting a pattern of marks and spaces for use in recording a plurality of reference fields so as to adaptively obtain the level conditioning parameters.

9. A method as claimed in claim 8, further comprising using a pattern comprising at least one of (i) a selected set of marks and spaces located in one or more frames of a recording medium and (ii) preamble bytes associated with one or more sectors of the recording medium corresponding to the read signal.

10. A method as claimed in claim 1, further comprising sampling the read signal at channel bit locations to provide a plurality of samples, and wherein selecting the main and neighbor samples is from the plurality of so provided samples.

11. A circuit, the circuit providing for conditioning samples of a read signal in storage technologies, the read signal comprising samples associated with a reference field, the circuit comprising:

sample logic, the sample logic providing a main sample and one or more selected neighbor samples from the read signal;

arithmetic logic coupled to the sample logic, the arithmetic logic comparing the main sample to the neighbor samples toward determining satisfaction of selected conditioning criteria; and conditioning logic coupled to the arithmetic logic and to the sample logic, the conditioning logic receiving the main sample and selectively effecting level conditioning when the selected conditioning criteria are determined to be satisfied.

12. A circuit as claimed in claim 11, further comprising one or more substitution level circuits, said circuits being coupled to the conditioning logic and providing selected substitution levels to the conditioning logic, the conditioning logic effecting level conditioning by selectively assigning one of the conditioning levels to the main sample responsive to the arithmetic logic.

13. A circuit as claimed in claim 12, wherein the substitution level circuits provide upper and lower substitution levels.

14. A circuit as claimed in claim 12, wherein a substitution level circuit comprises a reference mark analyzer.

15. A circuit as claimed in claim 11, wherein the sample logic selects neighbor samples responsive to the coding of the read signal.

16. A circuit as claimed in claim 11, wherein the arithmetic logic determines level differences between the main sample and each of a selected plurality of neighbor samples and determines whether such level differences have a common arithmetic sign.

17. A circuit as claimed in claim 11, further comprising sample selection logic, the sample selection logic being coupled to the conditioning logic, the sample selection logic implementing a preclusion function so as to preclude effecting level conditioning as to a selected main sample.

18. A circuit as claimed in claim 17, further comprising a conditioning trigger circuit coupled to the sample selection logic, the conditioning trigger circuit providing one or more conditioning trigger values.

19. A circuit as claimed in claim 18, wherein the conditioning trigger circuit comprises a reference field analyzer.

20. A circuit as claimed in claim 11, wherein the conditioning logic comprises a multiplexer, the multiplexer receiving the main sample and one or more substitution levels, the multiplexer further receiving one or more control signals responsive to the arithmetic logic, the multiplexer outputting one of the main sample or the substitution levels responsive to the control signals.

* * * * *